United States Patent
Stojkovic et al.

(10) Patent No.: US 10,023,096 B2
(45) Date of Patent: Jul. 17, 2018

(54) VEHICLE ROOF PILLARS WITH RECEPTACLES FOR CONNECTORS ON AN OUTER SIDE

(71) Applicant: FORD GLOBAL TECHNOLOGIES, LLC, Dearborn, MI (US)

(72) Inventors: Dragan B. Stojkovic, Taylor, MI (US); Colleen Marie Hoffman, Canton, MI (US); Stephen Thomas Kozak, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/342,592

(22) Filed: Nov. 3, 2016

(65) Prior Publication Data

US 2018/0118086 A1  May 3, 2018

(51) Int. Cl.
*B60J 7/00* (2006.01)
*B60P 7/08* (2006.01)
*B62D 25/06* (2006.01)
*B62D 25/04* (2006.01)
*B60R 9/055* (2006.01)
*B60R 9/02* (2006.01)
*B60R 9/08* (2006.01)
*E04H 15/08* (2006.01)

(52) U.S. Cl.
CPC .......... *B60P 7/0807* (2013.01); *B60P 7/0823* (2013.01); *B60R 9/02* (2013.01); *B60R 9/055* (2013.01); *B60R 9/08* (2013.01); *B62D 25/04* (2013.01); *B62D 25/06* (2013.01); *E04H 15/08* (2013.01)

(58) Field of Classification Search
CPC ........ B62D 25/06; B62D 25/04; B60J 1/1823; B60J 7/145; B60R 2021/23153; B60R 21/232; B60R 21/213; B60R 2021/23386; B60R 21/2338; B60R 2021/0435
USPC ....................................... 296/193.06
See application file for complete search history.

(56) References Cited

U.S. PATENT DOCUMENTS

| | | | | |
|---|---|---|---|---|
| 4,402,442 A * | 9/1983 | Martino | ................... | B60R 9/08 224/324 |
| 4,527,827 A * | 7/1985 | Maniscalco | ............... | B60R 9/08 108/44 |
| 5,292,045 A * | 3/1994 | Mandel | ..................... | B60R 9/00 224/309 |
| 5,381,939 A * | 1/1995 | Tippets | ..................... | B60R 9/04 224/309 |
| 5,492,259 A * | 2/1996 | Tippets | ..................... | B60R 9/00 224/309 |
| 5,779,271 A * | 7/1998 | Dorow | .................. | B60R 21/055 280/751 |

(Continued)

*Primary Examiner* — Kiran B Patel
(74) *Attorney, Agent, or Firm* — Jason Rogers; Brooks Kushman P.C.

(57) ABSTRACT

A vehicle roof structure including a plurality of roof support pillars that include a plurality of receptacles on an outer surface of the pillars. The receptacles are adapted to receive a connector for securing an article to a vehicle either directly or by means of a tie down strap. A spider roof structure or conventional roof structure are disclosed that may include either X-shaped receptacle openings or a T-track slot. Articles may be directly secured to the receptacles or slots on the outer surface of the pillars or may be connected to the roof or side outer walls of the pillar by tie down straps.

10 Claims, 5 Drawing Sheets

(56) References Cited

U.S. PATENT DOCUMENTS

| | | | | |
|---|---|---|---|---|
| 5,884,824 | A * | 3/1999 | Spring, Jr. | B60R 9/042 224/309 |
| 6,015,074 | A * | 1/2000 | Snavely | B60R 9/042 224/310 |
| 6,755,332 | B2 | 6/2004 | Crane et al. | |
| 7,114,221 | B2 * | 10/2006 | Gibbons | F16B 5/065 24/289 |
| 7,344,185 | B2 * | 3/2008 | Wright | B60R 13/0206 296/187.05 |
| 7,648,190 | B2 * | 1/2010 | Timmermans | B62D 25/06 296/178 |
| 8,919,867 | B2 * | 12/2014 | Davis | B62D 65/14 296/193.06 |
| 9,187,046 | B2 * | 11/2015 | Peck | B60R 9/10 |
| 9,694,757 | B2 * | 7/2017 | Sautter | B60R 9/052 |
| 2002/0084297 | A1 * | 7/2002 | Williams | B60R 9/042 224/310 |
| 2004/0051345 | A1 * | 3/2004 | Gabbianelli | B62D 21/11 296/203.01 |
| 2010/0043186 | A1 * | 2/2010 | Lesley | A44B 11/16 24/68 CD |
| 2012/0321409 | A1 * | 12/2012 | Lesley | B60P 7/0838 410/100 |
| 2013/0069395 | A1 * | 3/2013 | Nusier | B62D 25/06 296/203.03 |
| 2014/0069971 | A1 | 3/2014 | van Kaathoven | |
| 2015/0191127 | A1 * | 7/2015 | Sautter | B60R 9/052 224/331 |
| 2016/0046241 | A1 * | 2/2016 | Crismon | B60J 7/106 224/326 |
| 2016/0059906 | A1 * | 3/2016 | Leitner | B62D 33/0207 296/3 |
| 2018/0020781 | A1 * | 1/2018 | McNeill | A44B 18/0069 |

* cited by examiner

VEHICLE ROOF PILLARS WITH RECEPTACLES FOR CONNECTORS ON AN OUTER SIDE

TECHNICAL FIELD

A vehicle roof structure includes roof support pillars that define receptacles on the outer surface of the pillars for tie down straps or articles.

BACKGROUND

Vehicles designed for special applications such as off-road or recreation purposes may be referred to as sport utility vehicles. Such vehicles are used to transport camping gear, hunting and fishing equipment, surfboards, skis, bicycles, kayaks and other items. Prior utility vehicles and conventional vehicles have generally relied upon roof racks or trunk racks for attaching such articles to the outside of the vehicle. Roof racks are generally large enough to accommodate most types of gear but are inconvenient because the height of the roof is difficult to reach. Trunk racks are easier to reach but block the view to the rear and are generally too small to carry larger articles.

Sport utility vehicles, crossover vehicles and vans do not include convenient receptacles for attaching items such as awnings, work surfaces or tables to the vehicle that may be desirable at a camp site or work site. Generally, the Class A surfaces, or painted outer surfaces, of the passenger compartment roof support pillars are smooth uninterrupted surfaces. The function of roof support pillars is normally limited to supporting the roof. Roof support pillars are located in the spaces between windows. Additional options are needed in the way that articles are secured to vehicles.

This disclosure is directed to solving the above problems and other problems as summarized below.

SUMMARY

According to one aspect of this disclosure, a vehicle roof structure is disclosed that comprises a roof disposed over a passenger compartment of a vehicle on a plurality of pillars. A plurality of receptacles are provided on an outer surface of the pillars that are each adapted to receive a connector for securing an article to a vehicle.

According to another aspect of this disclosure, a vehicle having a roof is disclosed that comprises a longitudinal roof support and a plurality of pillars that define a plurality of window openings. The window openings are each adapted to receive a window. The pillars each have a transverse leg extending laterally outward from the roof support to a curved section and a vertical leg extending downward from the curved section. The vertical legs have an outer surface that defines a plurality of receptacles that are adapted to receive a connector for attaching an object to the outer surface of the vertical legs.

According to other aspects the disclosed vehicle roof structure or the vehicle having a roof as described above, the connector may be attached to a strap extending from the connector to a second connector received in one of the other receptacles. The strap may extend between two receptacles on the same pillar or to a different pillar to secure the article to one side of the vehicle. Several straps may be provided each on one of the pillars to extend between two receptacles on the same pillar or to a different pillar for securing the article to one side of the vehicle. The strap may extend between two receptacles on opposite sides of the vehicle to secure articles to the roof of the vehicle. Several straps may be provided that extend between two receptacles on opposite sides of the vehicle for securing articles to the roof of the vehicle.

The connector may be one of a plurality of connectors directly attached to a rigid planar member to secure the planar member to the outer surface of the pillars in a horizontal orientation. In another example, the connector may be one of a plurality of connectors directly attached to a retractable awning to secure the retractable awning to the outer surface of the pillars in a horizontal alignment.

The vehicle roof structure may further comprise a central structure extending longitudinally on the roof and centered between right and left sides of the vehicle. The central structure may define a second plurality of receptacles that are each adapted to receive a connector for securing an article to a vehicle. The central structure may also include a plurality of plates attached between adjacent pillars. The pillars may extend from a beltline of the vehicle to at least one of the plates and may form part of the central structure.

The above aspects of this disclosure and other aspects will be described below with reference to the attached drawings.

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

Figure 1:
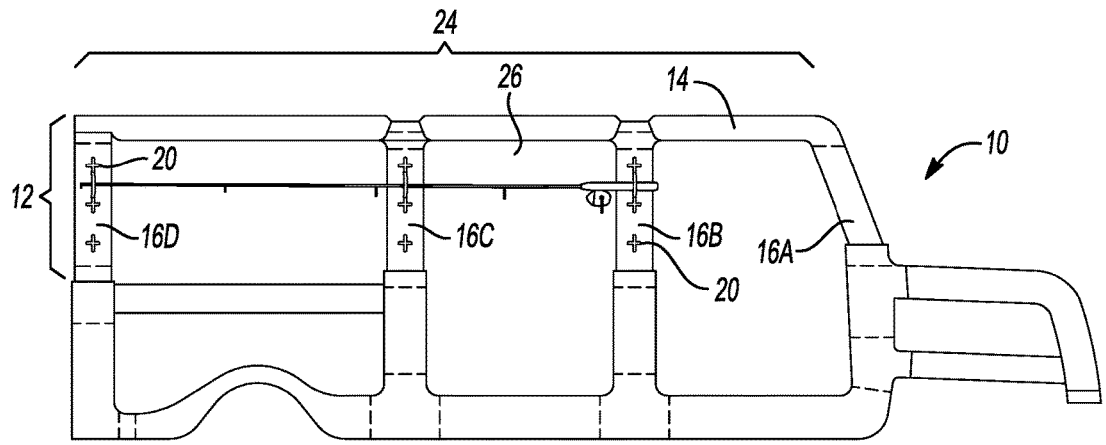
FIG. 1 is a side elevation view of a partially assembled vehicle body having receptacles in the outer surface of the roof pillars.
Figure 2:
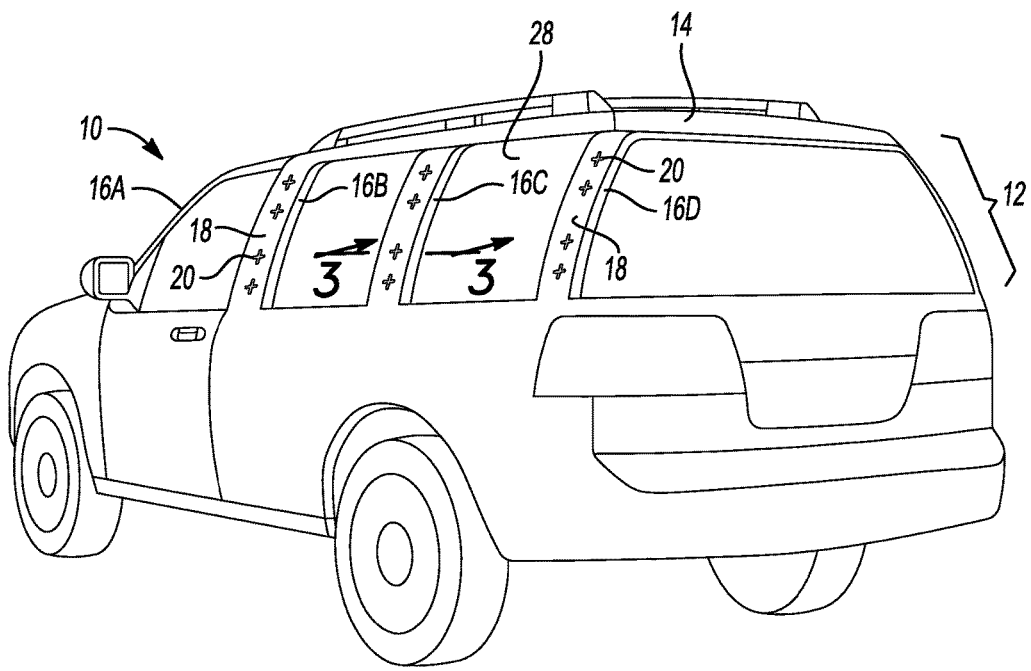
FIG. 2 is a left/rear perspective view of a support utility having roof pillars with receptacles in an outer surface of the roof pillars.

Referring to FIGS. 1 and 2, two different styles of vehicles 10 are illustrated. In FIG. 1, a vehicle having a spider frame roof structure 12 is illustrated. In FIG. 2, a vehicle with a conventional roof structure 12 is illustrated. The roof structure 12 includes a roof 14 and a plurality of roof support pillars 16 that are separately identified as 16A, 16B, 16C and 16D. Pillar 16A supports the windshield of the vehicle and pillar 16D is disposed at the rear most corner of the vehicle 10.

The roof support pillars 16A-16D each have an outer surface 18. Receptacles comprising openings defined in the outer surface 18 in the shape of a cross or "X" are provided on roof pillars 16B-16D. In the roof structure illustrated in FIG. 1, a longitudinal roof support 24 extends longitudinally in the center of the roof. Windows/door openings 26 are provided between the roof support pillars 16A-16D that are adapted to receive a window 28 between pillars 16B and 16C and 16C and 16D. A door 29 is received between roof pillars 16A and 16B. While no receptacles 20 are shown on pillar 16A, it should be understood that receptacles could be provided in roof pillar 16A. It should also be understood that one or more of the other pillars could be provided without receptacles 20.

Figure 3:
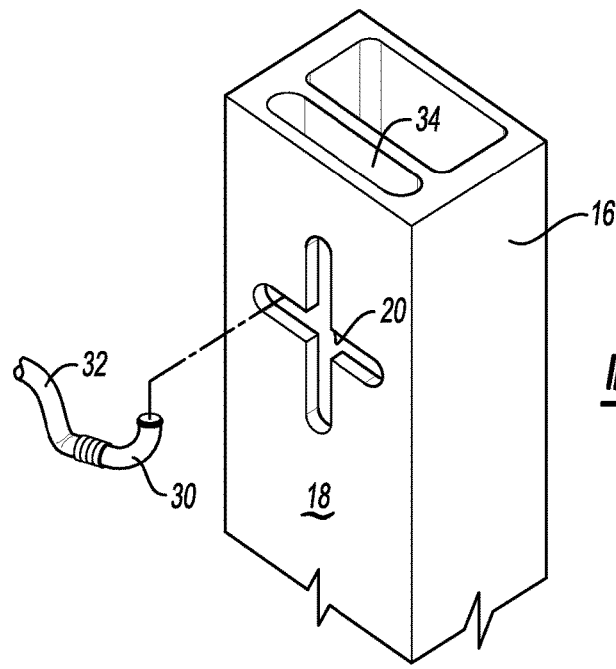
FIG. 3 is a fragmentary perspective view of a roof pillar including a receptacle and a connector of a tie down strap.

Referring to FIG. 3, a close-up fragmentary view of one of the roof pillars is shown to illustrate the receptacle 20 defined by the outer surface 18. A clearance slot 34 is defined within the roof support pillar 16 provides clearance for receiving a connector 30. The connector 30 may be secured to an end of a tie down strap 32 or alternatively may be part of an article that is adapted to be attached to the receptacles 20 defined by the roof support pillar 16.

Figure 4:
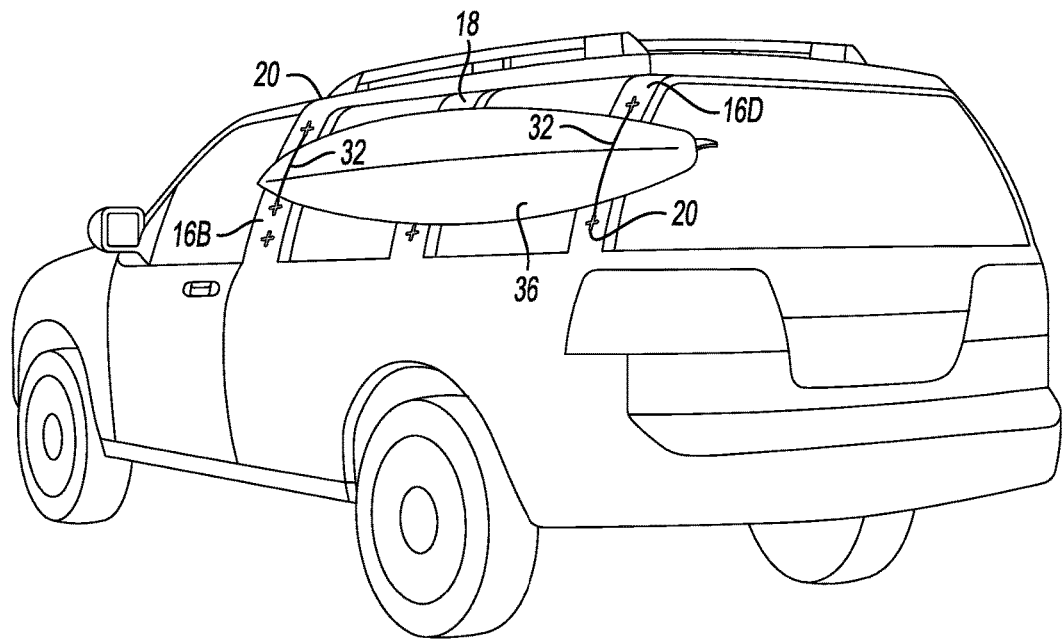
FIG. 4 is a left/rear perspective of a vehicle with a surf board attached to the outer side of the roof pillars.

Referring to FIG. 4, a surf board 36 is shown attached by two tie down straps 32 to the outer surface 18 of the roof support pillars 16B-16D. A tie down strap 32 including connectors 30 on opposite ends secures the front end of the surf board 36 to the B pillar. A second tie down strap 32 includes two connectors 30 that are secured to two receptacles 32 defined by the pillar 16D.

Figure 5:
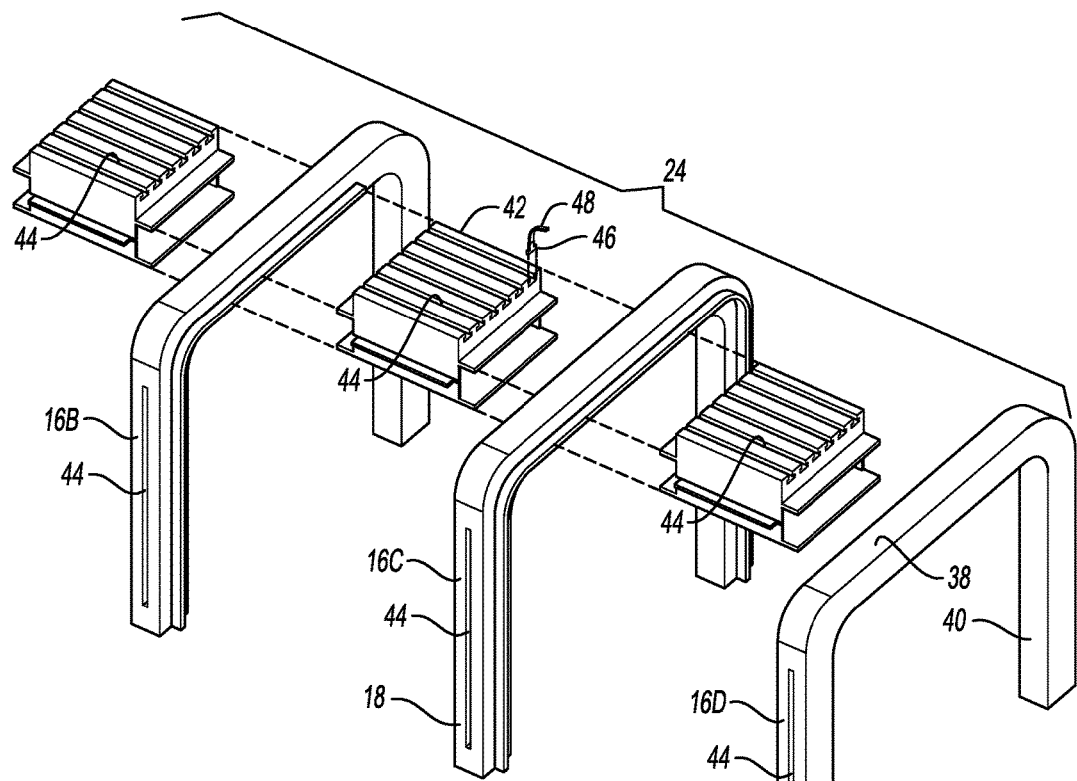
FIG. 5 is an exploded perspective view of a roof structure that according to the embodiment of FIG. 1 having tracks for receiving a connector on the outer side of the roof pillars and on the center support plates.
Figure 6:
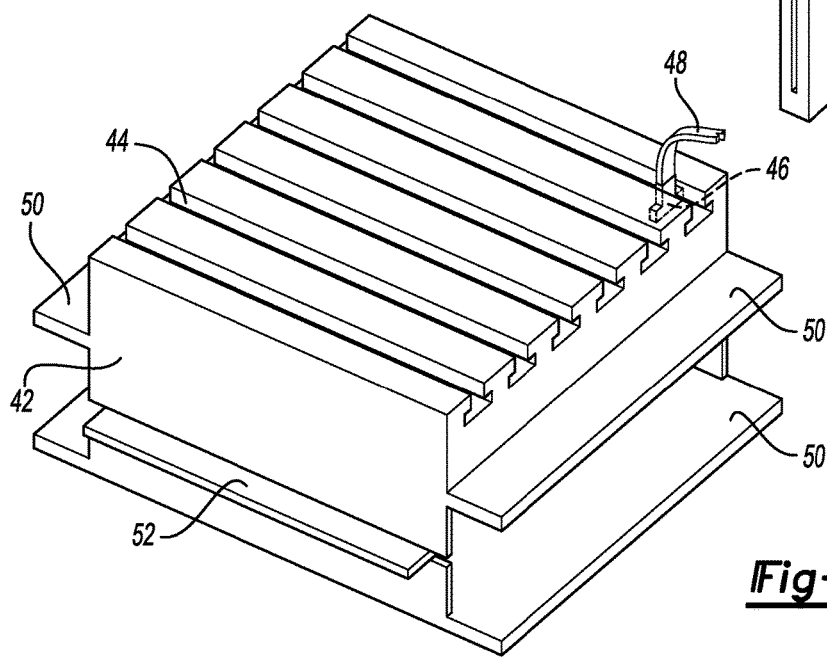
FIG. 6 is a perspective view of a longitudinal roof support plate as shown in FIG. 5.

Referring to FIGS. 5 and 6, an alternative embodiment of a roof structure 12 is shown in an exploded perspective view. The embodiment of FIG. 5 is similar to that shown in FIG. 1. The roof support pillars 16B-16D shown in FIG. 1 are shown to include a transverse leg 38 that extends across the roof of the vehicle 10. A vertical leg 40 extends from the beltline of the vehicle outwardly to the transverse leg 38. A plurality of plates 42 that may be of greater or lesser length than illustrated are provided to secure the transverse legs 38 of the roof support pillars 16B-16D together to form a longitudinal roof support 24. The plates 42 include a plurality of track receptacles 44. A T-connector 46 shown in FIG. 5 is attached to the end of a tie down strap 48 and is adapted to be inserted within the track receptacles 44 and rotated to be anchored in the track receptacle 44. Track receptacles 44 may also be provided in the outer surface 18 of the roof support pillar 16. Alternatively, track receptacles 44 could also be provided on the transverse legs 38 of the roof support pillar 16.

Referring to FIG. 6, a plate 42 is shown that includes track receptacles 44 that extend longitudinally relative to the vehicle. The track receptacles 44 define an elongated T-shaped slot in the top surface of the plates 42. A pair of pillar receiving flanges 50 is provided on the front and on the rear edge of the plate 42. A window support flange 52 is provided on right and left sides of the plate 42.

Figure 7:
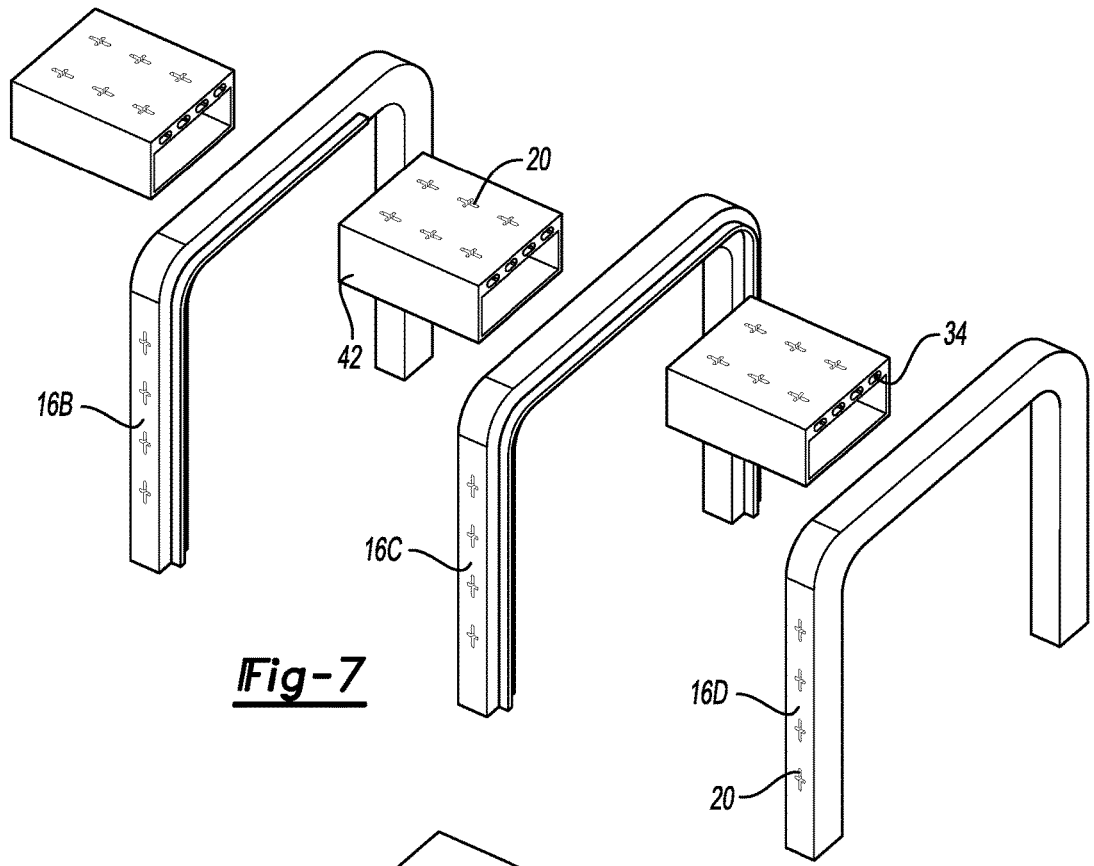
FIG. 7 is an exploded perspective view of a roof structure that according to the embodiment of FIG. 1 having a plurality of receptacles for receiving a connector on the outer side of the roof pillars and on the center support plates.

Referring to FIG. 7, another alternative embodiment is shown that is similar to the roof structure disclosed with reference to FIGS. 5 and 6 but it includes a plurality of receptacles 20. The receptacles 20 are provided in the vertical legs 40 of the roof support pillars 16B-16D. Receptacles 20 are also defined in the plates 42 that are used to connect the pillars 16 together.

Figure 8:
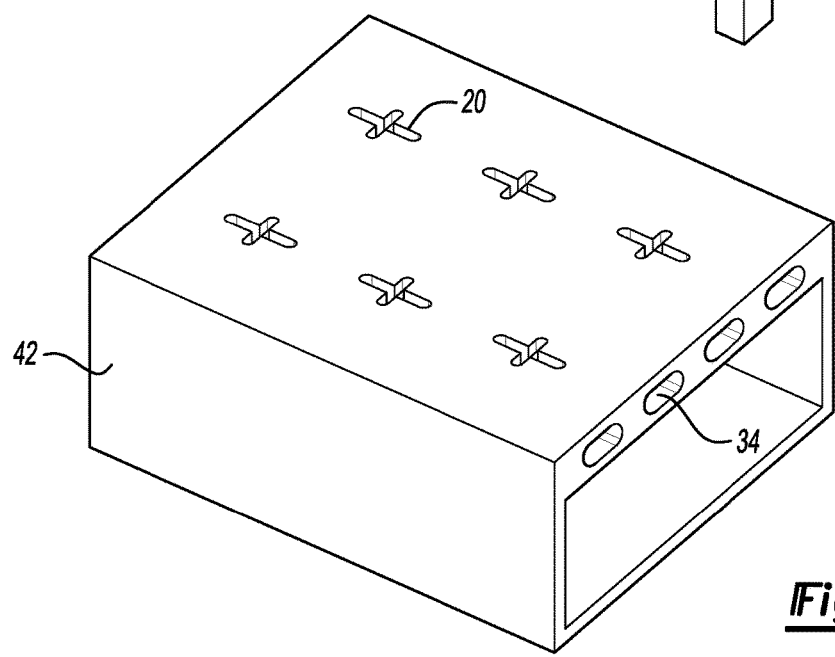
FIG. 8 a perspective view of a longitudinal roof support plate as shown in FIG. 7.

Referring to FIG. 8, the plates 42 including a plurality of receptacles 20 that are in the cross or X-shaped form are illustrated, the plates 42 also define clearance slots 34 that provide clearance for insertion of the connectors 30 that are inserted and rotated to anchor them to the receptacles 20.

Figure 9:
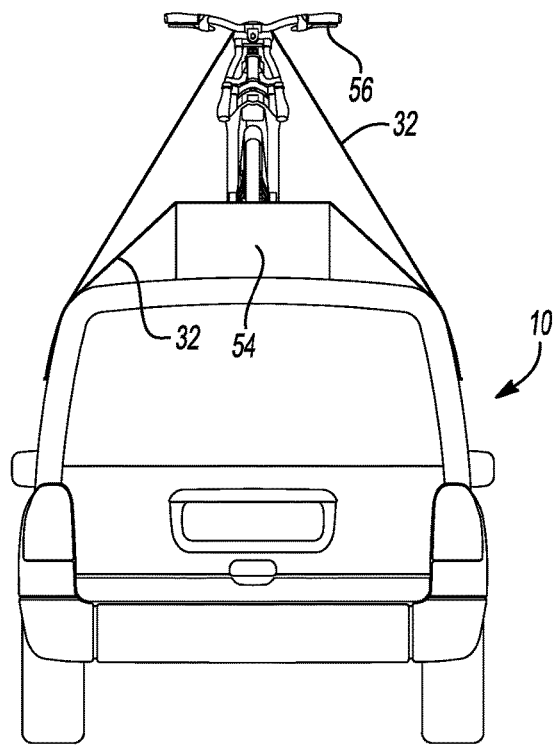
FIG. 9 is a rear elevation view of a support utility vehicle with a bicycle and a bin secured to the roof by tie down straps secured to the roof pillars.

Referring to FIG. 9, a vehicle 10 is shown with a bin 54 and a bicycle 56 shown attached to the roof of the vehicle by a plurality of tie down straps 32. The tie down straps 32 may be routed transversely across the vehicle between two pillars such as pillar 16D and 16D or may be routed diagonally between differently designated pillars such as being routed between 16B and 16D.

Figure 10:
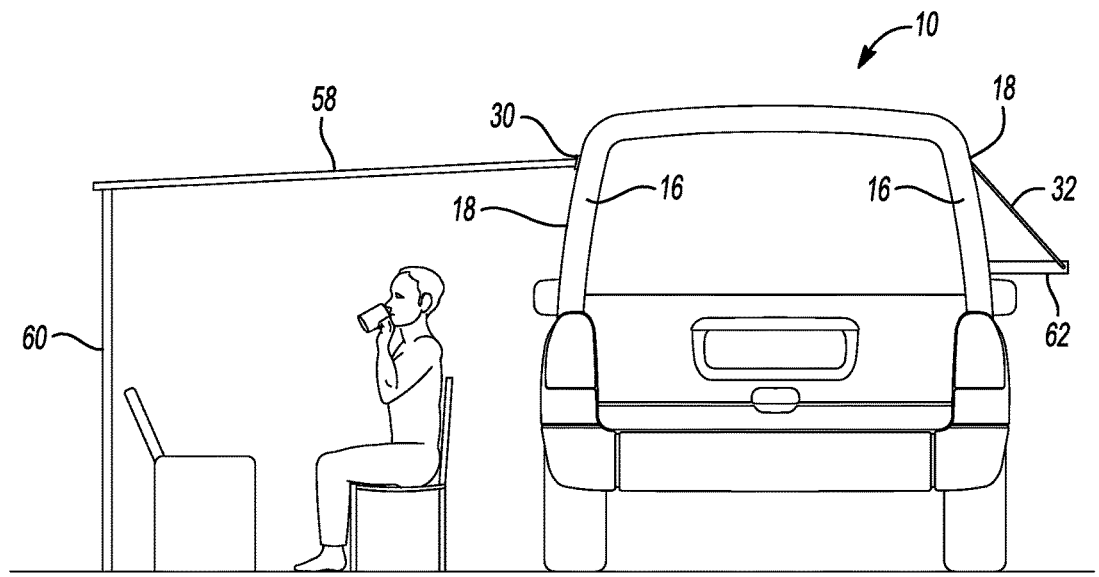
FIG. 10 is a rear perspective view of a support utility vehicle having an awning attached to the outer surface of the roof pillars and a table or shelf attached to the roof pillars on the opposite side of the vehicle.

Referring to FIG. 10, another alternative application is shown wherein the vehicle 10 is shown with an awning 58 attached to the left side of the vehicle 10. The awning 58 may be supported by a post 60 or other supporting member at the end of the awning 58 that is spaced from the vehicle 10. The awning 58 is attached by connectors 13 or T-connectors 46 to the outer side of the pillar 16 of the vehicle 10. A table/shelf 62 is shown attached the right side of the vehicle 10. The edge of the table/shelf 62 adjacent the vehicle 10 is connected by connectors 30 shown in FIG. 3 or T-connectors 46 shown in FIGS. 5 and 6. A tie down strap 32 may be used to secure a distal end of the table/shelf to the outer surface 18 of the pillar 16.

The embodiments described above are specific examples that do not describe all possible forms of the disclosure. The features of the illustrated embodiments may be combined to form further embodiments of the disclosed concepts. The words used in the specification are words of description rather than limitation. The scope of the following claims is broader than the specifically disclosed embodiments and also includes modifications of the illustrated embodiments.

What is claimed is:

1. A vehicle having a roof comprising:
   a longitudinal roof support;
   a plurality of pillars and the roof support defining a plurality of openings, the pillars having a transverse leg extending laterally outward from the roof support to a curved section, and a vertical leg extending downward from the curved section, the vertical legs having an outer surface defining a plurality of receptacles adapted to receive a connector; and
   a window assembled to each opening.

2. The vehicle of claim 1 wherein the connector is adapted to secure an article to a vehicle with a strap extending from the connector to a second connector received in another one of the receptacles.

3. The vehicle of claim 2 wherein the strap extends between two receptacles to secure the article to one side of the vehicle.

4. The vehicle of claim 3 wherein plural straps are provided that each extend between two receptacles to secure the article to one side of the vehicle.

5. The vehicle of claim 2 wherein the strap extends between two receptacles on opposite sides of the vehicle to secure the article to the roof of the vehicle.

6. The vehicle of claim 5 wherein plural straps are provided that each extend between two receptacles on opposite sides of the vehicle to secure the article to the roof of the vehicle.

7. The vehicle of claim 1 wherein the connector is one of a plurality of connectors directly attached to a rigid planar member to secure the planar member to the outer surface of the pillars.

8. The vehicle of claim 1 wherein the connector is one of a plurality of connectors directly attached to a retractable awning to secure the retractable awning to the outer surface of the pillars in horizontal alignment.

9. The vehicle of claim 1 further comprising:
   a central structure extending longitudinally on the roof and centered between right and left sides of a vehicle, wherein the central structure defines a second plurality of receptacles that are each adapted to receive a connector for securing an article to the vehicle.

10. The vehicle of claim 9 wherein the central structure further comprises:
    plural planar plates attached between adjacent pillars, wherein the pillars extend from a beltline of the vehicle to at least one of the plates and form part of the central structure.

* * * * *